United States Patent
Becher

(10) Patent No.: US 11,479,208 B2
(45) Date of Patent: Oct. 25, 2022

(54) LOCKING SYSTEM, IN PARTICULAR FOR A MOTOR VEHICLE

(71) Applicant: MARQUARDT GMBH, Rietheim-Weilheim (DE)

(72) Inventor: Andreas Becher, Villingen-Schwenningen (DE)

(73) Assignee: Marquardt GmbH, Rietheim-Weilheim (DE)

(*) Notice: Subject to any disclaimer, the term of this patent is extended or adjusted under 35 U.S.C. 154(b) by 0 days.

(21) Appl. No.: 17/293,106

(22) PCT Filed: Jul. 9, 2020

(86) PCT No.: PCT/EP2020/069365
§ 371 (c)(1),
(2) Date: May 12, 2021

(87) PCT Pub. No.: WO2021/032358
PCT Pub. Date: Feb. 25, 2021

(65) Prior Publication Data
US 2022/0118943 A1 Apr. 21, 2022

(30) Foreign Application Priority Data
Aug. 21, 2019 (DE) ...................... 10 2019 005 815.1

(51) Int. Cl.
*B60R 25/24* (2013.01)
*G07C 9/00* (2020.01)

(52) U.S. Cl.
CPC .......... *B60R 25/24* (2013.01); *G07C 9/00309* (2013.01); *G07C 2009/00793* (2013.01); *G07C 2209/61* (2013.01)

(58) Field of Classification Search
CPC ................ B60R 25/24; G07C 9/00309; G07C 2009/00793; G07C 2209/61
See application file for complete search history.

(56) References Cited

U.S. PATENT DOCUMENTS

| 6,693,581 B2 * | 2/2004 | Gottwald ................ B60R 25/24 342/60 |
| 2003/0085620 A1 * | 5/2003 | Herbrik ................. B60R 25/245 307/10.2 |

(Continued)

FOREIGN PATENT DOCUMENTS

| DE | 4340260 A1 | 4/1995 |
| DE | 10337717 A1 | 3/2005 |

(Continued)

OTHER PUBLICATIONS

Partial English machine translation for EP1508886A2 (5 pages). (Year: 2005).*

(Continued)

*Primary Examiner* — Brian E Miller
(74) *Attorney, Agent, or Firm* — Harness, Dickey & Pierce, P.L.C.

(57) ABSTRACT

A locking system (3) has a first device (4), with at least two states and configured as a control system for releasing and/or locking the car doors (6), the ignition lock, the steering wheel lock, for releasing and/or blocking the immobilizer, the motor control device or the like. An associated second device (5) is in the form of an electronic key, an ID transmitter, a chip card or the like. Both devices (4, 5) have transmission and/or receiving units (10) for the transmission of an electromagnetic signals (7). The transmission and/or receiving unit (10) has an antenna for transmitting the signals (7). At least one of the signals (7) transmitted between the second device (5) and the first device (4) is a coded operating signal for authenticating the second device (5). Thus, once the transmitted operating signal has been positively identified for the authorized second device (5), the state of the first device (4) can be modified. The transmission and/or receiving unit (10) for the first device (4) has two antennae (11, 12). A signal distributor (13), such as a power (Continued)

splitter, is provided for both antennae (11, 12). The transmission and/or receiving unit (10) is in communication with both antennae (11, 12) via the signal distributor (13).

9 Claims, 3 Drawing Sheets

(56) References Cited

U.S. PATENT DOCUMENTS

| | | | | |
|---|---|---|---|---|
| 2003/0142004 A1* | 7/2003 | Gottwald | ............... | G01S 13/767 342/51 |
| 2009/0133453 A1* | 5/2009 | Mueller | ............... | B60R 25/24 70/252 |
| 2013/0293348 A1* | 11/2013 | Obergfell | ............... | B60R 25/24 340/5.61 |
| 2017/0346156 A1* | 11/2017 | Morris | ............... | H01Q 1/1271 |
| 2018/0029560 A1* | 2/2018 | Mohaupt | ............... | B60R 25/255 |
| 2018/0070291 A1* | 3/2018 | Breaux | ............... | H04W 4/40 |
| 2019/0217816 A1* | 7/2019 | Lee | ............... | H04W 12/06 |
| 2022/0118943 A1* | 4/2022 | Becher | ............... | G07C 9/00309 |

FOREIGN PATENT DOCUMENTS

| | | |
|---|---|---|
| DE | 102014018668 A1 | 6/2015 |
| DE | 102017214800 A1 | 2/2019 |
| EP | 1508886 A2 | 2/2005 |
| EP | 1902913 A1 | 3/2008 |
| WO | WO-9850652 A1 | 11/1998 |
| WO | WO-2009109578 A2 | 9/2009 |
| WO | WO-2013094661 A1 | 6/2013 |

OTHER PUBLICATIONS

Partial English machine translation for EP1902913A1 (17 pages). (Year: 2008).*

International Search Report and Written Opinion of the International Searching Authority, issued in PCT/EP2020/069365, dated Oct. 30, 2020; ISA/EP.

Search Report from German 10 20190040815.1 dated Nov. 22, 2019.

* cited by examiner

LOCKING SYSTEM, IN PARTICULAR FOR A MOTOR VEHICLE

CROSS REFERENCE TO RELATED APPLICATIONS

This application is a 371 U.S. National Phase of International Application No. PCT/EP2020/069365, filed on Jul. 9, 2020, which claims priority to German Patent Application No. 10 2019 005 815.1, filed Aug. 21, 2019. The entire disclosures of the above applications are incorporated herein by reference.

FIELD

The disclosure relates to a locking system for providing authorization to access or drive a vehicle.

SUMMARY

In the case of increased security requirements, electronic locking systems are used that operate, for example, by means of electromagnetic waves. In particular in motor vehicles, such locking systems are used as door locking systems for access authorization, and/or as ignition lock systems, steering wheel locks, immobilizers or the like for driving authorization.

Locking systems are known from DE 43 40 260 A1. The locking system consists of a first device with at least two states. It is designed as a control system for unlocking and/or locking the car doors, the ignition lock or the like. An associated second device is in the form of an electronic key. For their intended operation, the two devices comprise transmission and/or receiving units for transmitting the signals, in particular electromagnetic signals. The transmission and/or receiving unit have an antenna for transmitting the signals. In the intended operation, at least one signal can be transmitted between the key and the control system as a coded operating signal for authenticating the key. Thus, after positive evaluation of the transmitted operating signal and when the key is authorized, a change in the state of the control system can be effected.

Such locking systems are also refined with so-called "keyless" functionalities. With "Keyless Entry" functionality, for example, manual operation of the electronic key by the user is no longer necessary. It is sufficient for the user to carry the key with him. The operating signal for access authorization is then automatically transmitted between the two devices when the user is in an operating area in the vicinity of the motor vehicle and operates the door handle on the car door, for example. Likewise, these locking systems can have a "KeylessGo" functionality, wherein the operating signal for driving authorization is automatically transmitted between the two devices when the user is inside the motor vehicle and, for example, presses a start/stop button in the dashboard.

In order to ensure optimum transmission of the signals both in the interior and exterior of the motor vehicle, a transmission and/or receiving unit with an antenna for the interior area and for the exterior area is provided in each case in the first device. The disadvantage of such a locking system therefore appears to be in particular the production cost.

The underlying object of the disclosure is to further develop the locking system in such a manner that it is more cost-effective with substantially the same functionality.

This object is achieved in a generic locking system by a locking system for providing authorization to access and/or drive a motor vehicle in the manner of a keyless entry/go functionality, comprising: a first device with at least two states designed as a control system, the control system for unlocking and/or locking car doors, ignition lock, steering wheel lock, for releasing and/or blocking immobilizer, engine control device or the like; a second device designed as an electronic key, an ID transmitter, a chip card or the like;

the two devices, for their intended operation, comprise transmission and/or receiving units for the transmission of electromagnetic signals, at least one of the signals transmitted between the second device and the first device is a coded operating signal for authentication of the second device, so that after positive evaluation of the transmitted operating signal, a change in the state of the first device can be effected in the case of an authorized second device and the transmission and/or receiving unit for the first device comprises two antennas, a signal distributor in the form of a power splitter is provided for the two antennas, and that the transmission and/or receiving unit is in communication with the two antennas by the signal distributor.

In the locking system according to the disclosure, only a single transmission and/or receiving unit is provided for the first device. The transmission and/or receiving unit for the first device includes two antennas. Furthermore, a signal distributor in the form of a power splitter is provided for the two antennas. The transmission and/or receiving unit is in communication with the two antennas via the signal distributor. Due to the fact that only the one single transmission and/or receiving unit is needed for both antennas, a substantial reduction of costs is achieved. Further configurations of the disclosure are the subject matter of the sub-claims.

For the purpose of good transmission of the signals in the respective area, the two antennas can be arranged spatially separated. In fact, one antenna can preferably be associated with the interior as an indoor antenna and the other antenna can be associated with the exterior as an outdoor antenna. In this way, good signal coverage can be achieved for the entire vehicle.

Furthermore, the signal distributor can operate the two antennas with different power in the manner of an asymmetrical signal distributor for the purpose of adaptation to the respective areas. In particular, it may be suitable for the signal distributor to operate the indoor antenna at about 10% and the outdoor antenna at about 90% of the total power for the transmission power. The disclosure further provides knowledge that the indoor antenna requires less power than the outdoor antenna, since a smaller area is to be covered by the indoor antenna.

In a further configuration, the signal distributor can have an input for signal transmission between the transmission and/or receiving unit and the signal distributor and an output between the signal distributor and the respective antenna. In this case, the signal strength for the output to the outdoor antenna can preferably be selected with almost no loss. In particular, the decoupling at the output to the outdoor antenna can be set with a loss of about 0.5 dB (decibels). Furthermore, the signal strength for the output to the indoor antenna can be selected to be lossy in this case. In particular, the decoupling at the output to the indoor antenna can be set with a loss of about 10 dB. Furthermore, the signal strength for the outdoor antenna can be set by means of a loose coupling between the input of the asymmetrical signal distributor and the output of the asymmetrical signal distributor to the indoor antenna.

Finally, the transmission of the signals can be performed by means of a carrier in the RF (radio frequency) range. In particular, it is suitable for the RF range to be the standardized Bluetooth, in particular Bluetooth Low Energy (BLE) with a carrier frequency of about 2.45 GHz. Furthermore, the second device can be a smartphone where a corresponding application program is installed, in particular one with a BLE (Bluetooth Low Energy) interface, which is already available to most users. In this respect, the costs can be saved conventionally incurred with an electronic key as a second device.

For a particularly preferred configuration of the disclosure, the following is to be noted.

The use of smartphones as vehicle keys is making its way into the first vehicles, in particular electric vehicles, such as Tesla vehicles. For comfort reasons, if possible, it is desirable that the smartphone does not have to be operated by the user, but rather has keyless functionality. A wireless interface at close range is particularly suitable for this comfort application. For this, the smartphone offers a Bluetooth Low Energy interface that operates at about 2.45 GHz. A disadvantage of this interface is the slightly higher frequency, which results in difficulties in signal coverage in the interior and/or exterior area. Solutions with one antenna are also opposed by the increased use of thermal insulation glazing which strongly attenuates high-frequency signals. However, the use of two spatially separated antennas also requires the use of two Bluetooth Low Energy transmission and/or receiving units for optimum signal coverage, which in turn leads to higher costs.

The disclosure provides that signal coverage for interior and/or exterior areas is implemented with two antennas and only one Bluetooth Low Energy transmission and/or receiving unit. In this case, the signal from the Bluetooth Low Energy transmission and/or receiving unit is distributed to the two antennas via an asymmetrical RF signal distributor. In the disclosure, the following knowledge is gained. If this were done with a simple symmetrical "power splitter", both antennas would lose half of the signal strength, which, in turn, would lead to a severe reduction in signal propagation. The reduced signal propagation would lead to a significantly reduced radio range, in particular in the exterior area. In contrast, the reduced radio range in the vehicle interior would have little effect on signal coverage because in the vehicle interior, the distances between the indoor antenna and the smartphone are considerably shorter. If an asymmetrical RF signal distributor is now used, loose coupling between the input of the asymmetrical RF signal distributor and the output to the indoor antenna can be used to adjust the signal strength for the outdoor antenna such that it is virtually lossless while still providing good indoor signal coverage for the indoor antenna with acceptable losses. In particular, it appears to be a good compromise to select an output of the indoor antenna with a loss of 10 dB, which in turn leads to a loss of 0.5 dB for the outdoor antenna.

The disclosure includes an asymmetrical RF signal distributor for signal coverage in the interior and/or exterior area of a vehicle for a smart access system. The disclosure can be used for all applications in which signal coverage is necessary in a body of a vehicle or in a room as well as in the exterior area of the body or room, wherein in particular the interior area should always be smaller than the exterior area.

The advantages achieved with the disclosure are, in particular, that the solution according to the disclosure saves costs for an additional transmission and/or receiving unit, which may be a Bluetooth Low Energy transmission and/or receiving unit. In addition, the disclosure makes it easier to maintain the Bluetooth Low Energy connection of the vehicle with the smartphone since the smartphone maintains this connection when the smartphone changes position from the interior area to the exterior area. In a solution with two Bluetooth Low Energy transmission and/or receiving units, this connection to the respective Bluetooth Low Energy transmission and/or receiving unit must always be re-established. This can result in malfunctions and/or signal delays, which is advantageously avoided in the invention.

DRAWINGS

The drawings described herein are for illustrative purposes only of selected embodiments and not all possible implementations, and are not intended to limit the scope of the present disclosure.

Exemplary embodiments of the disclosure with various refinements and configurations are shown in the drawings and are described in more detail below. In the figures.

DETAILED DESCRIPTION

Figure 1:
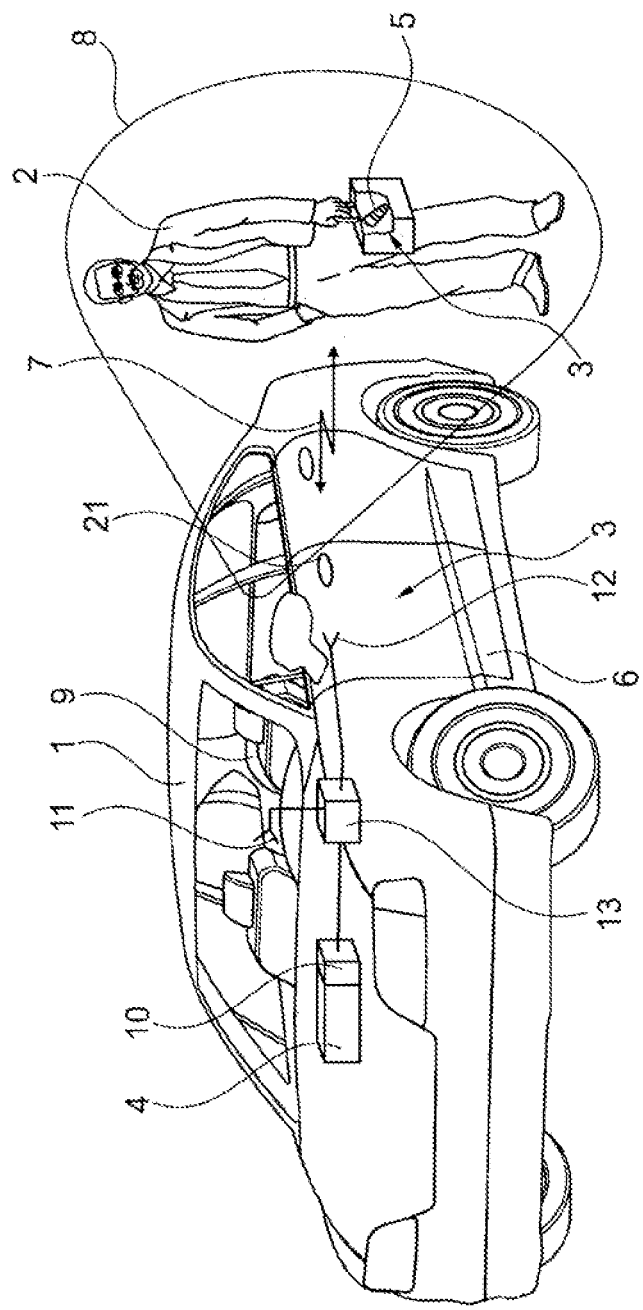
FIG. 1 is a schematic view of a motor vehicle equipped with a locking system.

In FIG. 1, a motor vehicle 1 with the authorized user 2 is shown. For access authorization, the motor vehicle 1 is provided with a locking system 3 as a door locking system, that includes a first device 4, designed as a control system, and an associated second device 5. The second device 5 is designed in the form of an electronic key, an identification (ID) transmitter, a chip card, a smart card or the like. The second device 5 is in the possession of the authorized user 2, whereby the latter has access to the motor vehicle 1 in the exterior area 8, and more precisely within an operating area 8, of the motor vehicle 1.

The first device 4 has at least two states. In the first state, a locking of the car doors is implemented. In the second state, an unlocking of the car doors 6 is implemented. For their intended operation, the two devices 4, 5 include transmission and/or receiving units with an antenna for the transmission of electromagnetic signals 7 by means of an electromagnetic carrier wave. At least one of these signals 7 transmitted between the second device 5 and the first device 4 is a coded, electromagnetic operating signal. The coded operating signal is used to authenticate the second device 5. Thus, after positive evaluation of the transmitted operating signal, a change in the state of the first device 4 can be effected in the case of an authorized second device 5. The transmission of coded operating signals take place when the authorized user 2 operates the door handle 21 on the car door 6 or approaches the door handle 21. As a result, the unlocking of the car doors 6 is triggered in accordance with the keyless entry functionality. Just as well, the transmission of the coded operating signal can also take place automatically without the involvement of the user 2 as soon as the user enters the operating area 8, but this will not be discussed in more detail below. If the user closes the car doors 6 from the outside, automatic locking of the car doors 6 takes place. Just as well, automatic locking of the car doors 6 can take place after the user has left the operating area 8.

Furthermore, the locking system 3 determines the driving authorization for the motor vehicle 1. For this purpose, the first device 4 designed as a control system also causes the ignition lock (electronic ignition lock EZS) and/or the steering wheel lock (electric steering wheel lock ELV) to be unlocked and/or locked in accordance with the two states. Just as well, another functionally relevant component of the motor vehicle 1 can be controlled accordingly by the first device 4. For example, this can enable and/or disable an immobilizer, the engine control unit, or the like. The transmission of the coded operating signal for authentication of the second device 5 takes place when the authorized user 2 is situated in the motor vehicle 1, thus in the interior area 9, and actuates a start/stop button. This triggers the starting process or the like of the motor vehicle 1 in accordance with the KeylessGo functionality. Advantageously, the start/stop switch is arranged on the gear selector lever, on the ignition lock, in the dashboard, in the center console or the like in the motor vehicle 1.

Only a single transmission and/or receiving unit 10 is provided for the first device 4, however, the transmission and/or receiving unit 10 includes two antennas 11, 12. The two antennas 11, 12 are arranged spatially separated. One antenna 11 is associated with the interior area 9 as an indoor antenna. The other antenna 12 is associated with the exterior area 8 as an outdoor antenna. The two antennas 11, 12 thus serve to provide signal coverage for the respective area 8, 9 of the vehicle 1. A signal distributor 13, in the form of a power splitter, is provided for the two antennas 11, 12. The transmission and/or receiving unit 10 in turn is connected to the two antennas 11, 12 by the signal distributor 13.

Preferably, the signal distributor 13 operates the two antennas 11, 12 with different power in the manner of an asymmetrical signal distributor. The power distribution is selected in such a manner that the respective associated area 8, 9 is covered. In order to achieve the coverage, it has proven to be useful that the signal distributor 13 operates the indoor antenna 11 with about 10% and the outdoor antenna 12 with about 90% of the total power or transmission power of the transmission and/or receiving unit 10. This distribution of the power is based on the gained knowledge that due to the substantially smaller area 9 to be covered, the indoor antenna 11 requires less power than the outdoor antenna 12 for the large area 8 to be covered.

Figure 2:
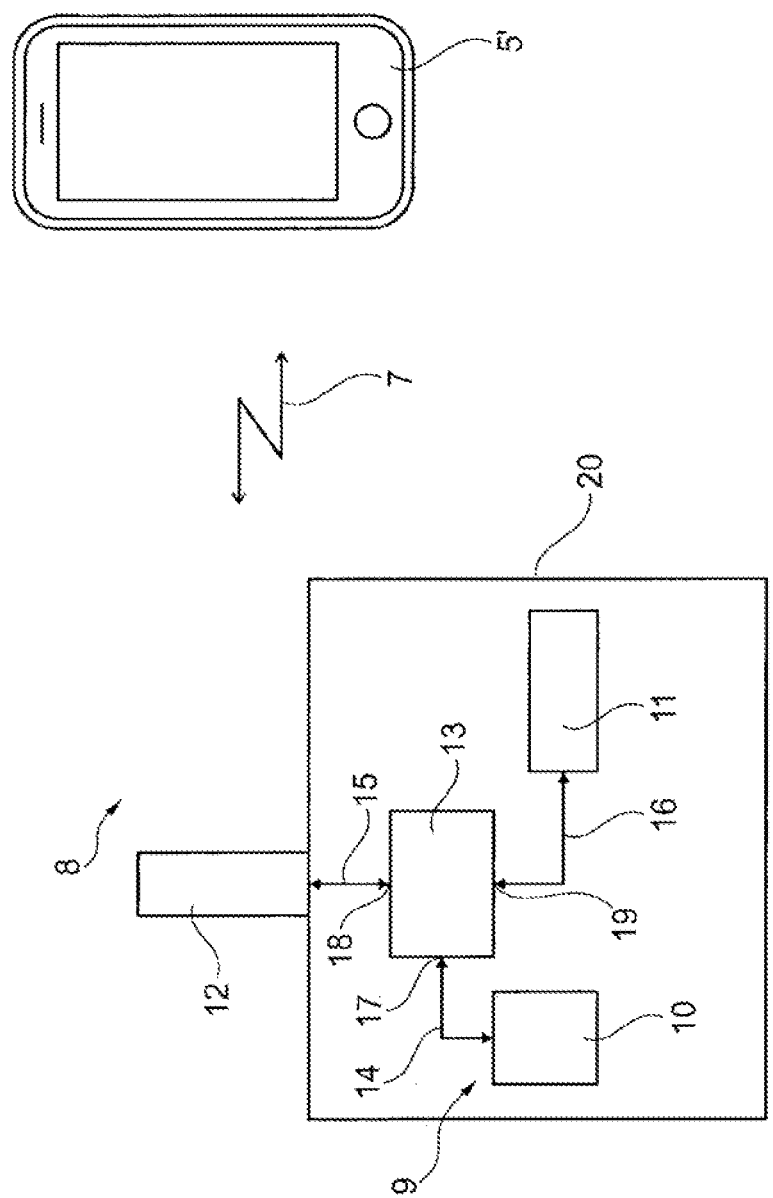
FIG. 2 is a schematic view of a locking system according to a further embodiment with a smartphone, located in the exterior area of the motor vehicle.
Figure 3:
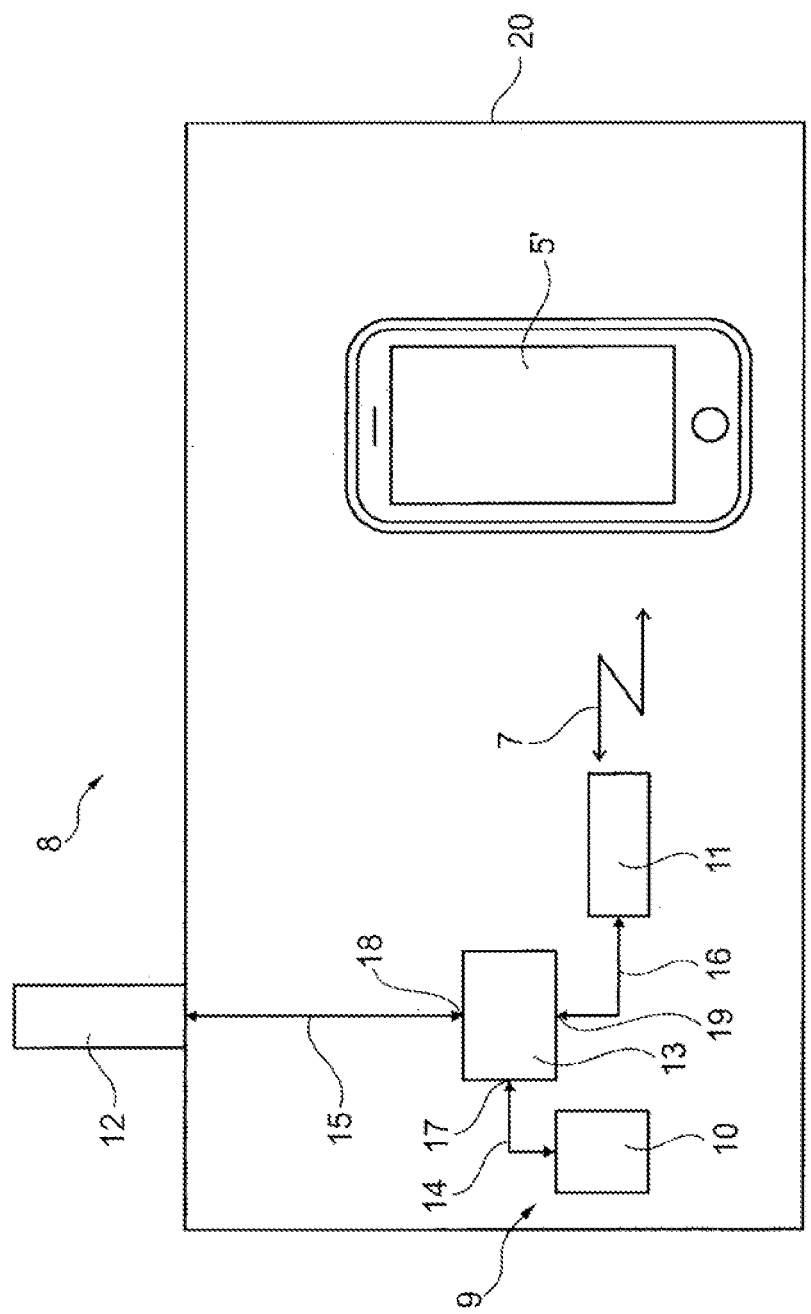
FIG. 3 is a schematic view of the locking system of FIG. 2, with the smartphone located in the interior area of the motor vehicle.

Instead of an electronic key or the like as the second device 5, a smartphone 5' can also be used as the second device, as shown in more detail in FIG. 2 and FIG. 3. As already mentioned, the transmission of the signals 7 takes place by an electromagnetic carrier, and preferably in the RF (radio frequency) range. Furthermore, the RF range may be a standardized Bluetooth connection, in particular Bluetooth Low Energy (BLE) with a carrier frequency of approximately 2.45 GHz. Usually, a smartphone 5' has a BLE (Bluetooth Low Energy) interface so that it makes sense to use it for the transmission of the signals 7.

In FIG. 2, the smartphone 5' located in the exterior area 8 can be seen in more detail. In order to transmit the signals 7, a Bluetooth Low Energy connection is used between the smartphone 5' and the outdoor antenna 12, which is designed as a BLE antenna and is located on the vehicle body 20 of the motor vehicle 1. The BLE transmission and/or receiving unit 10 of the first device 4 communicates with the signal distributor 13 via a BLE signal connection 14. For this purpose, the signal distributor 13 has an input 17 for signal transmission via the BLE signal connection 14. Furthermore, the signal distributor 13 has an output 18 to establish a BLE signal connection 15 to the outdoor antenna 12.

Furthermore, FIG. 3 shows the smartphone 5' located in the interior area 9 in greater detail. The Bluetooth Low Energy connection is again used for transmitting the signals 7 between the smartphone 5' and the indoor antenna 11, which is designed as a BLE antenna and is located inside the vehicle body 20 of the motor vehicle 1. Furthermore, the signal distributor 13 has an output 19 to establish a BLE signal connection 16 to the indoor antenna 11 is established.

As can be seen with reference to FIG. 2 and FIG. 3, the signal distributor 13 has an input 17 for signal transmission 14 between the transmission and/or receiving unit 10 and the signal distributor 13 and in each case one output 18, 19 between the signal distributor 13 and the respective antenna 12, 11. The signal strength for the output 18 to the external antenna 12 is almost lossless at the signal distributor 13. In particular, the decoupling at the output 18 to the external antenna 12 is set with only a loss of about 0.5 dB. The signal strength for the output 19 to the indoor antenna 11 is lossy. In particular, the decoupling at the output 19 to the indoor antenna 11 is set with a loss of about 10 dB. Furthermore, the signal strength for the external antenna 12 can be adjusted by a loose coupling between the input 17 of the asymmetrical signal distributor 13 and the output 19 of the asymmetrical signal distributor 13 to the internal antenna 11.

The disclosure is not limited to the described and illustrated exemplary embodiments. Rather, it also comprises all professional further developments within the scope of the patent claims. Thus, such a locking system 3 can be used not only in a motor vehicle 1, but applications iwhere signal coverage is required inside a room as well as in the exterior area of the room are also possible. In particular, a use for a door lock located, for example, on a building or the like, or for other control devices is also possible.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A locking system for providing authorization to access and/or drive a motor vehicle in the manner of a keyless entry-go functionality, comprising:
   a first device with at least two states is designed as a control system, the control system unlocks and/or locks car doors, ignition lock, steering wheel lock, releases and/or blocks an immobilizer or engine control device;
   a second device is one of an electronic key, an ID transmitter or a chip card;
   the two devices, comprise an unit for the transmission of electromagnetic signals, at least one signal transmitted between the second device and the first device is a coded operating signal for authentication of the second device, so that after positive evaluation of the transmitted operating signal, a change in state of the first device can be effected in a case of the authorized second device, the unit for the first device comprises two antennas, a signal distributor, in the form of a power splitter, is provided for the two antennas, unit is in communication with the two antennas by the signal distributor and the signal distributor operates the two antennas with different power as an asymmetrical signal distributor.

2. The locking system according to claim 1, wherein the two antennas are arranged spatially separated, and one antenna is associated with an interior area as an indoor antenna and the other antenna is associated with an exterior area as an outdoor antenna.

3. The locking system according to claim 2, wherein the signal distributor operates the indoor antenna with about 10% and the outdoor antenna with about 90% of the total power.

4. The locking system according to claim 1, wherein the signal distributor has an input for the signal transmission between the unit and the signal distributor and in each case one output between the signal distributor and the respective antenna, and the signal strength for the output to the outdoor antenna is almost lossless at the signal distributor, decoupling at an output to the outdoor antenna is set with a loss of about 0.5 dB, and that further the signal strength for the output to the indoor antenna is set to be lossy, decoupling at the output to an indoor antenna is set with a loss of about 10 dB.

5. The locking system according to claim 4, wherein the signal strength for the outdoor antenna is set by a loose coupling between the input of the asymmetrical signal distributor and the output of the asymmetrical signal distributor to the indoor antenna.

6. The locking system according to claim 1, wherein the transmission of the signals takes place by a carrier in the RF (radio frequency) range, and that the RF range is preferably Bluetooth, Bluetooth Low Energy (BLE) with a frequency Bluetooth of about 2.45 GHz.

7. The locking system according to claim 1, wherein the second device is a smartphone, in particular with a BLE (Bluetooth Low Energy) interface.

8. A locking system for providing authorization to access and/or drive a motor vehicle in the manner of a keyless entry-go functionality, comprising:
    a first device with at least two states is designed as a control system, the control system unlocks and/or locks car doors, ignition lock, steering wheel lock, releases and/or blocks an immobilizer or engine control device;
    a second device is one of an electronic key, an ID transmitter or a chip card;
    the two devices comprises an unit for the transmission of electromagnetic signals, at least one signal transmitted between the second device and the first device is a coded operating signal for authentication of the second device, so that after positive evaluation of the transmitted operating signal, a change in state of the first device can be effected in a case of the authorized second device, the unit for the first device comprises two antennas, a signal distributor in the form of a power splitter is provided for the two antennas, and that the unit is in communication with the two antennas by the signal distributor; and
    the signal distributor has an input for the signal transmission between the unit and the signal distributor and in each case one output between the signal distributor and the respective antenna, and the signal strength for the output to the outdoor antenna is almost lossless at the signal distributor.

9. The locking system of claim 8, where decoupling at an output to the outdoor antenna is set with a loss of about 0.5 dB, and that further the signal strength for the output to the indoor antenna is set to be lossy, decoupling at the output to an indoor antenna is set with a loss of about 10 dB.

* * * * *